United States Patent [19]

Sugimori et al.

[11] 4,429,114
[45] Jan. 31, 1984

[54] METHOD FOR TREATING EMULSIFIED LATEX

[75] Inventors: Teruhiko Sugimori; Hideaki Habara, both of Ohtake, Japan

[73] Assignee: Mitsubishi Rayon Co., Ltd., Tokyo, Japan

[21] Appl. No.: 378,331

[22] Filed: May 14, 1982

[30] Foreign Application Priority Data

May 15, 1981 [JP] Japan ................................. 56-73115

[51] Int. Cl.$^3$ ............................................... C08F 6/22
[52] U.S. Cl. ................................. 528/486; 528/487; 528/488; 528/490; 528/503
[58] Field of Search ............... 528/486, 487, 488, 490, 528/503

[56] References Cited

U.S. PATENT DOCUMENTS

| 2,647,103 | 7/1953 | Griffith et al. | 528/490 |
| 4,302,377 | 11/1981 | Gurak et al. | 528/490 |
| 4,303,569 | 12/1981 | Güurak et al. | 528/490 |

Primary Examiner—Stanford M. Levin
Attorney, Agent, or Firm—Oblon, Fisher, Spivak, McClelland & Maier

[57] ABSTRACT

There is disclosed a method for treating an emulsified latex which comprises discharging an emulsified latex containing particles of 1 $\mu$m or less in diameter into a coagulation solution from fine tubes which satisfy L/D$\geq$0.065 Re (L: length of fine tube, and D: equivalent diameter of fine tube and Re: Reynolds number) at a Reynolds number of 300 or less to coagulate the latex and washing and drying the coagulated latex to obtain a particulate of high bulk specific gravity containing substantially neither fine powders nor coarse particles or a pellet-like molded product.

14 Claims, 1 Drawing Figure

U.S. Patent
Jan. 31, 1984
4,429,114
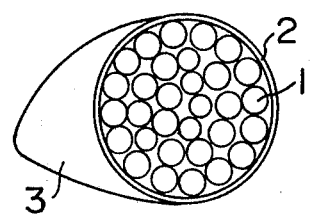

METHOD FOR TREATING EMULSIFIED LATEX

BACKGROUND OF THE INVENTION

This invention relates to a method for treating emulsified latexes.

Emulsified latexes are generally in the state of dispersed solid particles of 1 μm or less and since the particles are very small, industrially, it is difficult to separate and collect the solid particles as they are. Therefore, inorganic salts or acids are added to the emulsified latex or conversely the emulsified latex is added to aqueous solutions of inorganic salts or acids to once coagulate the emulsified latex and thereafter the coagulated latex is solidified by elevation of temperature and is collected as a particulate.

However, the thus obtained particulate has the following various problems to be solved.

(1) Problem of fine powders

The particulate obtained by the conventional coagulation methods is in grape cluster-like aggregations of emulsified latex particles of 1 μm or less, which aggregate by mere van der Waals force and so have a weak binding power between the constituting particles which easily disintegrate to produce large amounts of fine powder between the constituting particles. Various problems such as clogging of filter fabric during dehydration, reduction of washing efficiency, contamination of the working environment due to scattering of the fine powders during drying or transportation, dust explosion, etc. are encountered. A large amount of equipment is required to solve these problems and furthermore dust collectors such as cyclones, bag filters, etc. must be of excessively large size. In order that the particles do not scatter and can be collected by cyclones of proper size, it is desired that the particulate does not contain fine powders of 53 μm or less. Thus, development of a method for preparing particulate containing no such fine powders has been demanded.

(2) The problem of coarse particles

Production of coarse particles at coagulation causes various problems. For example, removal of impurities is difficult and quality is reduced; much air is required to fluidize the particulate during drying or transportation, water removal resistance in particles during drying reduces drying speed to necessitate a long drying time; etc. Considering these problems and problem of blending with other resins, it is generally undesirable for the particulate to contain particles of greater than 1.5 mm in diameter and desirably all particles should be of 1.0 mm or less in diameter.

(3) Increase in bulk specific gravity

When bulk specific gravity of the particulate is small, large storage vessels are required which increase storage costs and furthermore only a small amount of the particulate can be transported by one vessel to cause increase in transportation costs. Moreover, small bulk specific gravity causes scatter of particles or reduction of fluidity.

Since the particulate obtained by the conventional coagulation method is a grape cluster-like aggregation of emulsified latex particles of 1 μm or less, the particulate has many voids and there is a limit in making the specific gravity higher even if coagulation conditions are variously changed. For example, in the case of rubbery resins, the limit of bulk specific gravity is 0.35 g/cm$^3$ and it is desired to produce an integral particulate having no voids with a bulk specific gravity of 0.4 g/cm$^3$ or more.

(4) Reduction of wet powder water content

When emulsified latex is coagulated, then dehydrated and dried to obtain a particulate, the wet powder water content at the dehydration has a direct effect on the energy required for drying. Various trials to reduce the wet powder water content, e.g., selection of dehydrators have been made, but there is a limit depending on coagulation methods. Especially in the case of grape cluster-like particulate of emulsified latex particles of 1 μm or less as obtained by the conventional coagulation methods, the particulate has many voids and contains a large amount of water. Thus, it is desireable for the particulate to comprise coalescent emulified latex particles having very few voids. For example, in the case of graft copolymer resins of polybutadiene with styrene and acrylonitrile or graft copolymer resins of polybutadiene with styrene and methylmethacrylate, particulate produced by the conventional coagulation method has a wet powder water content of more than 30% (dry base) and it is desired to further reduce this water content to save drying energy.

(5) Others

Recently, fluidity of particulate which decides the possibility of using automatic meters has become important. Especially, from labor-saving viewpoint, there is an increasing tendency to use automatic meters in various devices while use of the automatic meters is limited in the case of the particulates produced by the conventional coagulation method. Thus, it is desired to make further labor-saving by improving fluidity of particulates. Besides there are still many problems to be solved such as particle size distribution, shape of particles, etc.

Therefore, it is desired that particulates obtained using coagulation method contain neither fine powders of 53 μm or less nor coarse particles of 1.5 mm or more preferably of 1.0 mm or more and having a bulk specific gravity of at least 0.4 g/cm$^3$ and that they have a wet powder water content at dehydration of 20% or less for saving drying energy.

Many attempts have been made to solve these problems which originate from coagulation methods, but none of them have completely overcome these problems. Recently, there has been proposed to simultaneously carry out coagulation and granulation of polymer latex in a vapor phase and it has been reported that said problems were nearly completely solved. However, this method still has problems to be solved, namely, since coaguation and granulation are simultaneously effected in a vapor phase, large and complicated equipment is required, control of operations is intricate, fine powders are apt to be formed because of the injection of latex into the vapor phase, particulates of large particle diameter cannot be produced because the size of droplets at injection is the maximum of particle size of particulate obtained therefrom.

The inventors have conducted intensive research to solve these problems and attained this invention.

SUMMARY OF THE INVENTION

The objects of this invention are accomplished by discharging an emulsified latex containing particles of 1

μm or less in diameter into a coagulation solution from fine tubes which satisfy $L/D \geqq 0.065Re$ (L: length of the tube, D: equivalent diameter of the tube and Re: Reynolds number) under the condition of Reynolds number of 300 or less to coagulate the latex, washing and drying the coagulated latex to obtain a particulate containing substantially neither fine powders nor coarse particles and which is high in bulk specific gravity or a pellet-like molded product.

BRIEF DESCRIPTION OF THE DRAWING

The FIGURE is an enlarged sectional view of a soft aggregation comprising coalescent particles which is obtained by this invention.

DESCRIPTION OF PREFERRED EMBODIMENT

When emulsified latex containing particles of 1 μm or less is gently discharged without forced injection into a coagulation liquid from fine tubes, slits, dies, etc. which satisfy the relation $L/D \geqq 0.065Re$ under conditions of the Reynolds number of 300 or less, preferably 100 or less, there are obtained soft aggregations which have various shapes such as string-, thread-, sheet-, or ball-like shape depending on the shape of the discharge orifice and discharge method and which are covered with apparently coagulated soft skin. When the skin of the surface of the soft aggregation is gently broken, it is found that there are many particles of 60 to 500 μm in diameter each of which is formed by coalescing of the emulsified latex particles.

The accompanying drawing shows an enlarged sectional view of a soft aggregation composed of coalescent particles obtained in accordance with this invention, wherein 1 indicates coalescent particle of 60 to 500 μm in diameter formed by coalescense of emulsified latex particles of 1 μm or less, 2 a surface skin of the soft aggregation composed of the coalescent particles and 3 the soft aggregation. The coalescent particles constituting the soft aggregation are fragile and easily broken down to the size of the emulsified latex particles by external force. However, when the aggregation is heated without breaking the surface skin or the coagulation conditions are made more severe by increasing concentration of coagulation solution to solidify the aggregation to some extent, the strength of the coalescent particles of 60 to 500 μm is increased and they are not broken even if considerably great external force is applied.

When the surface skin of the aggregation in this state is broken and ruptured by a shearing force, e.g., by agitation, there is formed a slurry in which the coalescent particles are dispersed and this slurry, if necessary solidified by elevation of temperature, is subjected to filtration and solid deposited is washed and then dried to obtain a particulate of high bulk specific gravity containing neither fine powders of 53 μm or less nor coarse particles of more than 1.5 mm. Furthermore, it is also possible to obtain a particulate of high bulk specific gravity containing neither fine powders nor coarse particles by solidifying said aggregation as it is without breaking the skin and forming the slurry.

Thus, it is the important point of this invention to produce a soft aggregation composed of particles of 60 to 500 μm which are formed by coalescence of emulsified latex particles of 1 μm or less. In order to form the coalescent particles of 60 to 500 μm, it is necessary that flow of emulsified latex is previously aligned to laminar flow state and that this is gently discharged into a coagulation bath without causing forced injection at the point of contact with the coagulation bath. It was reported by Boussinesq that in order to previously align a flow to laminar flow state in a fine tube a run-up distance (starting length or entry length) is required before the flow reaches complete laminar flow state after entering the fine tube, said run-up distance of laminar flow satisfying the formula $L1/D \geqq 0.065Re$ where L1 is the run-up distance for laminar flow, D is diameter of the fine tube and Re is the Reynolds number of the liquid flowing through the fine tube.

If Reynolds number of flow in the fine tube is increased and the length of the fine tube as a run-up distance for laminar flow does not satisfy said formula, no particles of 60 to 500 μm which are formed by coalescence of emulsified latex particles are seen in the soft aggregation even if the latex is not forcefully injected into the coagulation bath from the discharging hole and the aggregation becomes that of the emulsified latex particles per se. If the Reynolds number is decreased, also particles of 60 to 500 μm are not formed in the soft aggregation when the latex is gently discharged into a coagulation bath from a fine tube the length of which is shortened so that the formula $L/D \geqq 0.065Re$ is not satisfied. Furthermore, even if a fine tube having sufficient run-up distance for laminar flow is used, there is a limit in flow velocity in such a fine tube and a Reynolds number of 100 or less provides stable coalescent particles, about 200 or more provides somewhat unstable particles and more than 300 provides substantially no coalescent particles because the latex is forcefully injected into the coagulation bath.

Therefore, a soft aggregation composed of coalescent particles of 60 to 500 μm which are formed by coalescence of emulsified latex particles can be obtained by gently discharging emulsified latex into a coagulation solution using a fine tube having the run-up distance for laminar flow which was reported by Boussinesq (namely, a fine tube satisfying the formula $L/D \geqq 0.065Re$) at a Reynolds number of liquid in fine tube of 300 or less, preferably 200 or less, more preferably 100 or less.

Any apparatuses for discharging emulsified latex into a coagulation solution such as nozzles, slits, dies, etc. may be used as long as the emulsified latex can be aligned to a complete laminar flow therein and can be gently discharged into a coagulation solution without any forcible injection. Thus formed lump soft aggregation covered with a soft skin which is apparently coagulated can have various shapes such as thread-, string-, rosary-, sheet-, ball-, plate-like shapes depending on the kind of discharging apparatus. The coagulation bath may be a static bath or a bath agitated to such a degree that the soft aggregation is not apparently ruptured.

In order that the coalescent particle of 60 to 500 μm in diameter which is a constituting unit of the soft aggregation is not easily ruptured, the coagulation conditions must be made severer and this is attained by elevation of the coagulation bath temperature, addition of additional coagulants, etc. Unless the soft aggregation is once somewhat solidified in this way and then disintegrated, the minimum constituting coalescent particle of 60 to 500 μm is ruptured into emulsified latex particles of 1 μm or less to result in a particulate containing fine powders of 53 μm or less. On the other hand, if the soft aggregation is solidified too much, the aggregation is difficult to disintegrate and disintegration conditions must be made severer. These disintegration conditions may vary depending on concentration of the coagulation bath, coagulation temperature, degree of solidification, kind of emulsified latex, kind of additives, shapes of the objective particulate, but the condition may be such that the surface skin of the lump aggregation composed of the coalescent particles of 60 to 500 μm can be torn and broken. For example, in the case of agitator of agitation tank type which is commonly employed, such conditions as providing flows of at least 1000, preferably at least 3000 in Reynolds number are required.

For some object, it is also possible to produce particulate of high bulk specific gravity having neither fine powders nor coarse particles by forming aggregations of shape and size suitable to the object and solidifying them as they are. Moreover, thus solidified particulate may also be dried and then disintegrated.

For still another object, it is also possible to discharge the latex in strand form into a coagulation solution from fine tubes. For this purpose, it is necessary to use a fine tube which satisfies $L/D \geq 0.1 Re$ and $L/D \geq 20$ (L: length of the tube, D: equivalent diameter of the fine tube and Re: Reynolds number) under the conditions of Reynolds numbers of 200 or less. Thus obtained strand-like products may be cut as they are into pellets or, if necessary, the strands may be solidified by elevation of temperature or making the coagulation conditions severer, melting them and cutting them into pellets. Thus, the pellets can be produced more advantageously than by the conventional methods from the points of saving of energy and simplification of steps.

The concentration of coagulant in the coagulation bath into which the emulsified latex is discharged may be within the range employed in the conventional coagulation methods. However, when the concentration is too low, uncoagulated latex floats to cause production of fine powders and when too high, removal of impurities is difficult causing reduction of performance of products. Therefore, concentration of coagulant should be controlled to optimal conditions. For example, when emulsified latex of a graft copolymer of polybutadiene with styrene and acrylonitrile containing 30 to 50% by weight of solid matter is coagulated with sulfuric acid, sulfuric acid is used as 0.01 to 5.0, preferably 0.1 to 3.0% by weight aqueous solution and when the coagulant is magnesium sulfate this is used as 0.1 to 10, preferably 1 to 5% by weight aqueous solution. When emulsified latex of a graft copolymer of polybutadiene with styrene and methyl methacrylate which contains 30 to 50% by weight of solid matter is coagulated with sulfuric acid, this coagulant is used as 0.005 to 1, preferably 0.01 to 0.5% by weight aqueous solution and when the coagulant is magnesium sulfate, this is used as 0.01 to 5, preferably 0.1 to 0.5% by weight aqueous solution.

Temperature of coagulation bath may be within the range at which coagulation can be performed, but generally the following usual method may be employed, namely, coagulation at 10° to 50° C., previous solidification at 30° to 90° C. and subsequent further solidification at a temperature higher than the heat deformation temperature of resin by 5° to 20° C.

Most of polymer latexes which can be obtained and recovered by emulsion polymerization can be used as emulsion latexes in this invention. As especially effective emulsified latexes, mention may be made of latexes obtained by emulsion polymerization of ethylenic monomers, rubber-like polymer latexes, latexes obtained by graft polymerization of rubber-like polymers with ethylenic monomers and mixtures of these latexes.

As the ethylenic monomers, mention may be made of styrene monomers such as styrene, α-methylstyrene, o-ethylstyrene, o-chlorostyrene, p-chlorostyrene, divinylbenzene, etc., acrylonitrile monomers such as acrylonitrile, vinylidene cyanide, etc., acrylic acid or acrylic esters such as methyl acrylate, ethyl acrylate, etc., methacrylic acid or methacrylic esters such as methyl methacrylate, ethyl methacrylate, etc., vinyl esters such as vinyl acetate, etc., vinylidenes such as vinylidene chloride, etc., vinyl halides such as vinyl chloride, etc., vinyl ketones, acrylic amides, maleic anhydride, etc. These monomers may be used alone or as mixtures.

As the rubber-like polymers, mention may be made of natural or synthetic rubber-like polymers such as natural rubber, butadiene rubber, styrene-butadiene copolymers, acrylonitrile-butadiene copolymers, isoprene rubber, chloroprene rubber, acrylic rubber, ethylene-vinyl acetate copolymer, etc.

As the coagulants for polymer latexes, all of the generally used acids and water soluble inorganic salts may be used. The acids include mineral acids such as sulfuric acid, hydrochloric acid, etc. and organic acids having a dissociation constant of at least $10^{-6}$ mol/l such as acetic acid, etc. (including benzoic acid, salicylic acid, formic acid, tartaric acid) and the salts include sulfates such as magnesium sulfate, sodium sulfate, etc., chlorides, acetates, etc. Mixtures of them may also be used.

Known additives such as dispersants, lubricants, thickening agents, surfactants, plasticizers, antioxidants, coloring agents, foaming agents, etc. may be previously added to the polymer latex. Especially the dispersants sometimes have a great effect on form-stability of secondary particles produced upon coagulation. As the dispersants, there may be used inorganic and organic dispersants generally used as stabilizers in emulsion polymerization or suspension polymerization. The inorganic dispersants include magnesium carbonate, tribasic calcium phosphate, etc. Natural and synthetic high-molecular dispersants among the organic dispersants include starch, gelatin, acrylamide, partially saponified polyvinyl alcohol, partially saponified polymethyl methacrylate, polyacrylic acid and salts thereof, cellulose, methylcellulose, polyalkylene oxide, polyvinylpyrrolidone, polyvinylimidazole, sulfonated polystyrene, etc. Low-molecular dispersants include common emulsifiers such as alkylbenzene sulfonates, fatty acid salts, etc.

Furthermore, formation of secondary particles can be made easy and particle shape can be controlled by the addition of starch syrup, paraffins, etc. as the thickening agents.

In the following examples, all percents are by weight and the water content is % based on dry powders.

Example 1

Styrene and acrylonitrile were graft copolymerized with polybutadiene to obtain an emulsified latex (solid content 45%, viscosity 0.1 poise and density 1 g/cm$^3$) of 0.2 μm in mean particle diameter which comprised 45% of polybutadiene, 39.1% of styrene and 15.9% of acrylonitrile. This emulsified latex was discharged into a 1% aqueous sulfuric acid solution at 30° C. from fine tubes of 0.7 mm in inner diameter and 1 cm in length at a linear speed of 50 to 100 cm/sec. Reynolds number in the fine tube at this time was 35 to 70 and run-up distance necessary for laminar flow was 0.32 cm. Thus, the conditions for forming laminar flow were sufficiently satisfied. The emulsified latex became soft aggregations of 300 to 600 μm having apparently coagulated surface skins. When the skin was gently broken by a needle tip it was found that coalescing particles of 100 to 200 μm were present in the form of a coherent clump like cod's-roe. The solution was heated, as it was, to 95° C., left to stand for 10 minutes and thereafter filtered, and solid matter was washed with water, dehydrated and then dried to obtain a particulate. This particulate had a mean particle diameter of 400 μm and contained neither fine powders of 100 μm or less nor coarse particles of 1.0 mm or more. It had a high bulk specific gravity of 0.5 g/cm and a low wet powder water content of 15%. This was an ideal particulate.

Example 2

Example 1 was repeated except that the linear speed of the flow of emulsified latex in the fine tube was increased to 200 cm/sec. Under this condition, Reynolds number in the fine tube was 140, the necessary run-up distance for laminar flow was 0.64 cm and thus the latex could be completely aligned to laminar flow. When the skin of a soft aggregation formed in the coagulation solution was broken, coalescent particles of 100 to 200 μm were present in the form of a coherent clump. The obtained particulate had a mean particle diameter of 350 μm, contained neither fine powders of 53 μm or less nor coarse particles of 700 μm or more and had a high bulk specific gravity of 0.45 g/cm³ and a very low wet powder water content of 19% at dehydration.

Example 3

Example 1 was repeated except that the linear speed of the emulsified latex flow in the fine tube was increased to 300 cm/se. Under this condition, Reynolds number in the fine tube was 210, the necessary run-up distance for laminar flow was 0.96 cm and thus the flow in the fine tube was aligned to laminar flow. When the skin of a soft aggregation in the coagulation bath, was broken coalescent particles of 100 to 150 μm were present in the form of a coherent clump. The obtained particulate has a mean particle diameter of 300 μm, contained neither fine powders of 53 μm or less nor coarse particles of 700 μm or more and had a high bulk specific gravity of 0.42 g/cm³ and a very low wet powder water content of 20% at dehydration.

Reference Example 1

The same emulsified latex as used in Example 1 was added into a 2% aqueous sulfuric acid solution (amount of sulfuric acid used per resin was 5%) and was heated to 95° C. to coagulate the latex. The coagulated latex was filtered off, washed with water, then dehydrated and dried to obtain particulate. This particulate was an aggregation in which the particles had a mean diameter of 200 μm, contained 13% of fine powders of 53 μm or less, had a bulk specific gravity of 0.34 g/cm³ and had a wet powder water content at dehydration of 32%. The particulate was of indefinite shape and was very low in fluidity.

Reference Example 2

Reference Example 1 was repeated except that the linear speed of emulsified latex flow in the fine tube was increased to 400 cm/sec. Under this condition, Reynolds number in the fine tube was 280, but the necessary run-up distance for laminar flow was 1.3 cm. Thus, the length of the fine tube of 1 cm was insufficient. A mixture of some emulsified products and soft aggregations was formed from the emulsified latex discharged from the fine tubes. The soft aggregation was taken out and the skin was broken by a needle tip to find substantially no coalescent particles. Particulate obtained from the solution in the same manner as in Example 1 contained 10% of fine powders of 53 μm or less and had a very low bulk specific gravity of 0.31 g/cm³. Wet powder water content at dehydration was 32% which was high.

Example 4

The same emulsified latex as used in Example 1 was discharged into a 1% aqueous sulfuric acid solution at 30° C. from fine tubes of 2 mm in inner diameter and 1 cm in length at a linear speed of 10 to 20 cm/sec. Reynolds number in this fine tube at this time was 20 to 40, the necessary run-up distance for laminer flow was 0.52 cm and thus the flow was sufficiently aligned to laminar flow. The emulsified latex become string-like soft aggregations of 1 to 2.5 mm having apparently coagulated surface. The aggregation was taken out and the skin was broken by a needle tip to find coalescent particles of 200 to 300 μm in the form of a coherent clump. The solution was heated to 80° C. to solidify the aggregations and left to stand for 10 minutes. Then, the solution was agitated by a propoller type agitator with two blades of 10 cm in diameter at a revolution speed of 800 rpm to disintegrate the aggregations. Apparent viscosity was 1 poise and Reynold number was about 1300. The slurry obtained by such disintegration and dispersion was heated to 95° C. to further solidify the disintegrated aggregations and they were filtered off, washed, dehydrated and dried to obtain particulate.

Thus obtained particulate had a mean particle diameter of 300 μm and contained neither fine powders of 53 μm or less nor coarse particles of 1 mm or more. It had a bulk specific gravity of 0.43 g/cm³ and a low wet powder water content of 19.5% at dehydration.

Example 5

Example 4 was repeated except that fine tubes of 2 mm in inner diameter and 3 cm in length were used and linear speed in the tube was 100 cm/sec. Reynolds number in the fine tube at this time was 200 and the necessary run-up distance for laminar flow was 2.6 cm, and thus the flow was sufficiently aligned to laminar flow. The emulsified latex discharged into coagulation solution became soft aggregations of 1 to 3 mm. When surface skin was broken, coalescent particle of 150 to 300 μm in the form of a coherent clump were observed. Particulate obtained in the same manner as in Example 4 had a mean diameter of 350 μm, contained neither fine powders of 53 μm or less nor coarse particles of 1.5 mm or more and had a bulk specific gravity of 0.40 g/cm³ and a low wet powder water content of 20% at dehydration.

Reference Example 3

Example 4 was repeated except that the flow velocity in the fine tube was increased to 50 cm/sec. The Reynolds number in the fine tube at this time was 100 and the necessary run-up distance for laminar flow was 1.3 cm. The length of the fine tube did not meet this condition. Emulsified latex discharged into the coagulation solution under such conditions partially floated in the form of latex and when skin of the formed lumps was broken, substantially no coalescent particles were seen. Particulate obtained by heating, disintegrating and solidifying with heat in the same manner as in Example 4 had a mean particle diameter of 280 μm and contained 13% of fine powders of 53 μm or less and no coarse particles of 1 mm or more, but had a small bulk specific gravity of 0.28 g/cm³ and a high wet powder water content of 33% at dehydration.

Example 6

Emulsified latex (mean particle diameter 0.1 μm, solid content 45%; viscosity 0.1 poise and density 1 g/cm³) which comprised 50% of butadiene component, 20% of styrene component and 30% of methyl methacrylate component was prepared by graft copolymerization of a styrene-butadiene copolymer with styrene and methyl methacrylate. This emulsified latex was discharged into a 0.2% aqueous sulfuric acid solution at 30° C. from fine tubes of 0.7 mm in inner diameter and 1 cm in length at a linear speed of 50 to 100 cm/sec. Reynolds number in the fine tube at this time was 35 to 70, the necessary run-up distance for laminar flow was 0.32 cm and the flow in the fine tube was sufficiently aligned to laminar flow. The emulsified latex discharged into the coagulation solution became soft aggregations of 400 to 700 μm surface of which was apparently coagulated. When surface skin of the soft aggregations taken out was broken by a needle tip, it was found that coalescent particles of 200 to 300 μm were present in the form of a coherent clump. The solution, as it was, was heated to 85° C. and left to stand for 10 minutes and the aggregations were filtered off, washed with water, dehydrated and dried to obtain a particulate.

Thus obtained particulate had a mean particle diameter of 500 μm, contained neither fine particles of 100 μm or less nor coarse particles of 1.0 mm or more and, had a high bulk specific gravity of 0.43 g/cm³ and a very low wet powder water content of 17% at dehydration.

Example 7

The same emulsified latex as used in Example 6 was discharged into a 0.2% aqueous sulfuric acid solution at 30° C. from a fine tube of 2 mm in inner diameter and 1 cm in length at a linear speed of 10 to 20 cm/sec. The Reynolds number in the fine tube at this time was 20 to 40, the necessary run-up distance for laminer layer was 0.52 cm and the flow in the fine tube was sufficiently aligned to laminer flow. The emulsified latex in the coagulation solution became string-like lumps of 1.5 to 3 mm the surface of which was apparently coagulated. When the surface skin of the lumps taken out was gently broken by a needle tip, coalescent particles of 200 to 300 μm in the form of a coherent clump were found. The solution was heated to 70° C. to solidify the lumps and left to stand for 10 minutes. Then, the lumps were disintegrated by a propeller type agitator of 10 cm in diameter at a revolution speed of 800 rpm. The apparent viscosity of the solution was 1 poise and the Reynolds number was about 1300. The thus disintegrated and dispersed slurry was heated to 85° C. to further solidify the disintegrated lumps, which were filtered off, washed, dehydrated and dried to obtain a particulate.

The particulate had a mean particle diameter of 400 μm, contained neither fine powders of 53 μm or less nor coarse particles of 1 mm or more and had a high bulk specific gravity of 0.44 g/cm³ and a wet powder water content of 18% at dehydration.

Reference Example 4

The same emulsified latex as used in Example 6 was added to a 0.2% aqueous sulfuric acid solution so that the amount of sulfuric acid per resin was 1.5% to coagulate the latex. The coagulated latex was filtered off, washed with water, dehydrated and dried to obtain a particulate. This particulate had an entirely indefinite shape and one particle was an aggregation of fine particles which was a structure which very easily produces fine powders. The particulate had a mean particle diameter of 150 μm, contained 30% of fine powders of 53 μm or less and many coarse particles and had a low bulk specific gravity of 0.31 g/cm³ and a wet powder water content at dehydration was 45%.

Example 8

Emulsified latex (solid content 35%; viscosity 0.2 poise; density 1 g/cm³ and mean particle diameter 0.1 μm) of vinyl chloride obtained by emulsion polymerization was discharged into a 1% aqueous sulfuric acid solution at 30° C. from fine tubes of 0.7 mm in inner diameter and 1 cm in length at a linear speed of 100 cm/sec. The Reynolds number in the fine tube at this time was 35, and the necessary run-up distance for laminar flow was 0.16 cm. Thus, laminar flow conditions were sufficiently satisfied.

The emulsified latex discharged into the coagulation both became soft aggregations of 500 to 700 μm having apparently coagulated surface skin. When the surface skin was gently broken, there were seen coalescent particles of 200 to 300 μm in the form of a coherent clump. The solution, as it was, was heated to 80° C. and left to stand for 10 minutes. Thereafter, the aggregations were filtered off, washed with water, dehydrated and dried to obtain particulate. This particulate had a mean particle diameter of 600 μm, contained neither fine particles of 100 μm or less nor coarse particles of 1.0 mm or more and had a high bulk specific gravity of 0.48 g/cm³ and a low wet powder water content of 13% at dehydration.

Reference Example 5

The same emulsified latex as used in Example 7 was coagulated by the conventional coagulation method, namely, by adding the emulsified latex to a 2% aqueous sulfuric acid solution so that amount of sulfuric acid was 4% per resin. The solution was heated to 80° C. to solidify the coagulated latex and this was filtered off, washed with water, dehydrated and then dried to obtain a particulate. This particulate had a mean particle diameter of 300 μm, contained 18% of fine powders of 53 μm or less, and no coarse particles of 1.0 mm or more, but had a low bulk specific gravity of 0.28 g/cm³ and a high wet powder water content of 32% at dehydration.

Example 9

Emulsified latex (viscosity 0.1 poise and density 1 g/cm³) of polybutadiene which had a solid content of 50% and a mean particle diameter of 0.1 μm was discharged into a 10% sulfuric acid coagulation both at 70° C. from fine tubes of 0.7 mm in inner diameter and 1 cm in length at a linear speed of 50 cm/sec to obtain long string-like lumps. When surface skin of a lump was broken by a needle tip, coalescent particles of 100 to 200 μm were seen. When the solution was heated to 92° C. with agitation, lengths of the string-like lumps became 2 to 3 cm. The string-like lumps were water-washable and filterable and had a low wet powder water content of about 50% while latex coagulated by the conventional coagulation method, namely, one-time addition became crumbly and could not be washed with water nor filtered off.

Example 10

Emulsified latex (solid content 45%, viscosity 0.1 poise and density 1 g/cm$^3$) prepared by graft copolymerization of 45% of polybutadiene with 39.1% of styrene and 15.9% of acrylonitrile was discharged into a 1% aqueous sulfuric acid solution at 25° C. from fine tubes of 1 mm in inner diameter and 190 mm in length at a linear speed of 25 cm/sec. The Reynolds number in the fine tube at this time was 25 and this sufficiently satisfied the relation of L/D>0.1 Re and L/D≧20. The thus discharged strand-like product of the emulsified latex was solidified in hot water at 90° C., then dried with superheated steam of 5 kg/cm$^2$ and cut by a cutter to obtain a pellet-like product.

Example 11

Emulsified latex (solid content 45%, viscosity 0.1 poise and density 1 g/cm$^3$) obtained by graft copolymerization of 45% of polybutadiene with 39.1% of styrene and 15.9% of acrylonitrile was discharged into a 1% aqueous sulfuric acid solution at 25° C. from fine tubes of 0.8 mm in inner diameter and 100 mm in length at a linear speed of 100 cm/sec. The Reynolds number in the fine tube was 80 which satisfied the relation L/D>0.1 Re. The thus obtained strand-like product was heated to 90° C. to solidify it and then cut to obtain a pellet-like product.

Reference Example 6

Emulsified latex (solid content 45%, viscosity 0.1 poise and density 1 g/cm$^3$) obtained by graft copolymerization of 45% of polybutadiene with 39.1% of styrene and 15.9% of acrylonitrile was discharged into a 1% aqueous sulfuric acid solution at 25° C. from fine tubes of 1 mm in inner diameter and 15 mm in length at a linear speed of 180 cm/sec. The latex diffused to a large extent in the aqueous sulfuric acid solution and strand-like product was not obtained. Reynolds number in the fine tube was 180 and L/D was 15 and the conditions of this invention were not satisfied.

Example 12

Emulsified latex (solid content 45%, viscosity 0.1 poise and density 1 g/cm$^3$) comprising 50% of butadiene component, 20% of styrene component and 30% of methyl methacrylate and obtained by graft copolymerization of a copolymer of styrene and butadiene with styrene and methyl methacrylate was discharged into a 0.3% aqueous sulfuric acid solution from fine tubes of 0.8 mm in inner diameter and 120 mm in length at a linear speed of 35 cm/sec to coagulate the latex in the form of strands. The Reynolds number in the fine tube was 24, L/D was 150 and the conditions of this invention were sufficiently satisfied. The thus obtained strand-like product was solidified in a hot water of 80° C. and was further heated by an infrared heater into semimolten state. It was then cooled and thereafter cut into pellets by a cutter. The obtained pellets had a cylindrical form of about 1 mm in diameter and 5 mm in length and the feeding state of the pellets into injection machines was very good.

Example 13

Emulsified latex (solid content 45%, viscosity 0.1 poise and density 1 g/cm$^3$) comprising 50% of butadiene component, 20% of styrene component and 30% of methyl methacrylate which was obtained by graft copolymerization of a styrene-butadiene copolymer with styrene and methyl methacrylate was discharged into a 0.3% aqueous sulfuric acid solution from fine tubes of 1 mm in inner diameter and 200 mm in length at a linear speed of 180 cm/sec. The Reynolds number in the fine tube was 180 and the relation L/D>0.1 Re was satisfied, but some fine powders were produced. The obtained strand-like product was solidified in hot water at 80° C. and cut to obtain pellets.

Example 14

Emulsified latex of vinyl chloride (solid content 35%, viscosity 0.2 poise and density 1 g/cm$^3$ and mean particle diameter 0.1 μm) obtained by emulsion polymerization was discharged into 1% aqueous sulfuric acid solution at 30° C. from fine tubes of 1 mm in inner diameter and 200 mm in length at a linear speed of 20 cm/sec to obtain strand-like product. This product was solidified in hot water at 90° C., then dried with steam of 5 kg/cm$^2$ and cut by a cutter to obtain pellets. The obtained pellets had a cylindrical form of about 1 mm in diameter and 5 mm in length. The Reynolds number in the fine tube was 20 and L/D was sufficiently greater than 0.1 Re. Thus, the conditions of this invention were satisfied.

Example 15

Emulsified latex of polybutadiene (solid content 50%, mean particle diameter 0.1 μm, viscosity 0.1 poise and density 1 g/cm$^3$) was discharged into a 10% aqueous sulfuric acid solution at 70° C. from fine tubes of 1.2 mm in inner diameter and 200 mm in length at a linear speed of 30 cm/sec to obtain strand-like product. The Reynolds number in the fine tube was 36 and L/D was sufficiently greater than 0.1 Re. Thus, conditions of this invention were satisfied. Thus obtained strand-like product was heated to 70° C. in hot water, further solidified and dried by a steam drier at 80° C. and cut by a cutter to obtain pellets.

What is claimed is:

1. A method for producing a particulate of a high bulk specific gravity containing substantially no finely powdered material nor a coarse powdered material from an emulsified latex, which comprises:

discharging an emulsified latex having a Reynolds number of 300 or less containing particles of 1 μm or less in diameter from fine tubes which satisfy the relationship: L/D≧0.065 Re, wherein L is the length of the fine tubes, D is the equivalent diameter of the fine tubes and Re is the Reynolds number into a coagulation solution to coagulate the latex; and washing and drying the coagulated latex.

2. The method of claim 1, wherein said coagulated latex is composed of coalesced particles of a particle size ranging from 60 to 500 μm.

3. The method of claim 2, which further comprises agitating the coagulated latex containing coalesced particles under more severe conditions, and then obtaining a particulate product.

4. The method of claim 3, which further comprises, after said severe coagulation step, disintegrating the soft aggregations obtained by subjecting the latex to a shearing force to obtain a particulate.

5. The method of claim 3 or 4, wherein the said more severe coagulation conditions are accomplished by elevating the coagulation bath temperature, adding additional coagulants to the latex or a combination of both of these treatments.

6. The method of claim 1, wherein said emulsified latex has a Reynolds number of 200 or less.

7. The method of claim 1, wherein the emulsified latex has a Reynolds number of 100 or less.

8. The method of claim 1, wherein said coagulated latex particles have a bulk specific gravity of at least 0.4 g/cm$^3$.

9. The method of claim 1, wherein said latex is an ethylenic polymer latex, a rubber-like polymer latex or a latex of a rubber-like polymer upon which is grafted an ethylenic monomer.

10. The method of claim 1, wherein the temperature of said coagulation ranges from 10° to 50° C.

11. A method for producing a pellet-like product from an emulsified latex, which comprises:
   discharging an emulsified latex having a Reynolds number of 300 or less containing particles of 1 μm or less in diameter from fine tubes which satisfy the relationship: $L/D \geq 0.065$ Re, wherein L is the length of the fine tubes, D is the equivalent diameter of the fine tubes and Re is the Reynolds number into a coagulation solution to coagulate the latex thereby forming a strand-like product; and
   cutting the strand-like product into pellets.

12. The method of claim 11, wherein the Reynolds number of said emulsified latex is 200 or less and said fine tubes satisfy the relationships: $L/D \geq 0.1$ Re and $L/D \geq 20$.

13. The method of claim 11, wherein said strand-like products are solidified and then cut into pellets.

14. The method of claim 11, wherein the emulsified latex has a Reynolds number of 100 or less.

* * * * *